UNITED STATES PATENT OFFICE 2,411,019

METHOD OF FORMING CARBOXYLIC ACID SUBSTITUTED AMINES

Frederick C. Bersworth, Verona, N. J.

No Drawing. Application May 1, 1943,
Serial No. 485,343

5 Claims. (Cl. 260—112)

This invention relates to chemistry and more particularly to organic chemistry and has for its object the provision of a method of converting the alpha amino acid content of naturally occurring protein materials, such as casein, albumin, soy bean meal, beet sugar residues, and the like, into commercially useful amino compounds.

Another object is to provide a method of recovering the alpha amino acid content of protein materials in the form of carboxylic acid substituted amines.

Still another object is to provide a method of producing carboxylic acid substituted amines.

Other objects will be apparent as the invention is more fully hereinafter disclosed.

This application is a continuation-in-part application of my application Serial No. 363,109 filed October 24, 1940, now issued as Patent 2,318,046 dated May 4, 1943, which application is assigned to the same assignee as the present application.

In accordance with these objects I have discovered that when a protein molecule is hydrolyzed in the presence of a basic metal oxide or hydroxide, the peptide linkages (—NH—OC—) between the plurality of alpha amino acid molecules of which the protein molecule consists, are broken up and that the carboxylic acid group of the resultant alpha amino acids are stabilized by conversion to a metal salt thereby releasing the alpha amino nitrogen group for reaction with an amino hydrogen of an amino nitrogen group of an aliphatic amine whereby ammonia ($NH_3$) is liberated with the substitution of the carboxylic acid salt residue of the amino acid onto the amino nitrogen of the amine resulting in the formation of a substituted amine. Accordingly, by varying the extent to which the protein molecule is degraded or split up into shorter chain length groups of peptide-linked molecules of the alpha amino acids, a plurality of substituted amines from the same amine may be obtained containing carboxylic substituent groups of varying chain length ranging from a chain length equivalent to that of a single amino acid molecule up to a chain length equivalent to a large number of amino acid molecules joined together by peptide-linkages with the end carboxylic acid group of the chain stabilized as the metal salt of a basic metal and the opposite end group minus the alpha amino group and attached to the amino nitrogen group of the amine.

The reaction involved in the present invention may be most simply illustrated in the case of a protein molecule which consists of a plurality of molecules of glycine

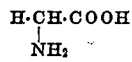

bound together by peptide linkages extending between the alpha amino nitrogen group of one glycine molecule and the carboxylic acid group of another glycine molecule. This peptide linkage is generally indicated as follows:

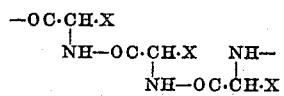

(wherein X=H or the remainder of the amino acid attached to the alpha CH group).

When this protein molecule is hydrolyzed $H^+$ and $OH^-$ ions enter into the peptide linkages (NH—OC) between adjacent glycine molecules converting the same to $NH_2$ and COOH groups respectively. In the absence of a basic metal ion the $NH_2$ and COOH groups of each glycine molecule react together to form an ammonium salt, but in the presence of a basic oxide or hydroxide capable of displacing the acid hydrogen, the carboxylic acid group reacts to form a metal salt. With the NaOH, for example, the sodium salt

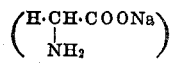

is formed with liberation of $H_2O$.

Other metal oxide and hydroxides, the metal constituent of which is capable of displacing acid hydrogens, react similarly as will be apparent to one skilled in the art. However, the more strongly basic metal oxides and hydroxides are preferable as will hereinafter appear.

In the presence of an aliphatic primary or secondary amine that contains at least one amino nitrogen group having at least one displaceable amino hydrogen which amino nitrogen group is attached directly to an aliphatic carbon, the metal salt of the alpha amino acid reacts therewith with liberation of ammonia ($NH_3$) to form a carboxylic acid substituted amine in which the substituent carboxylic group for each amino hydrogen of the amine consists of the carboxylic acid salt residue of the amino acid after the removal therefrom of the alpha amino nitrogen group. This reaction proceeds as follows:

(1) *Secondary amine*

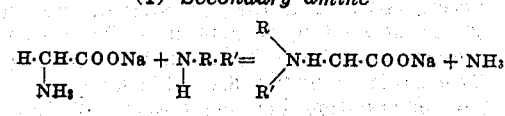

(2) *Primary amine*

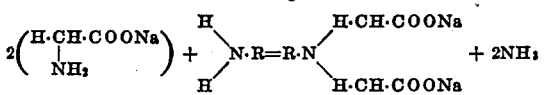

(3) *Polyamine (di-amine)*

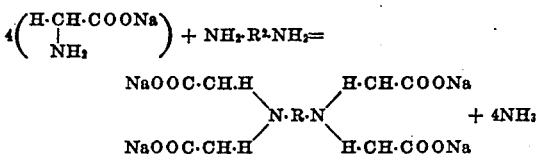

In the above equations R equals the residue of an aliphatic amine that contains at least one amino nitrogen group, the said residue containing an aliphatic carbon bound directly to the amino nitrogen N; R' equals a group substituted for one amino hydrogen; R² equals $(CH_2)_n$ where $n$ equals at least 2; and in the formula

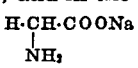

for the amino acid salt, "X" may be present as a substituent group for the H attached to the alpha carbon group (CH) and any other basic metal ion M may be present in place of Na in the carboxyl group. Alanine, for example,

contains a $CH_3—$ group in substitution for the H bound to the alpha CH group present in glycine, and leucine, as another example, contains the complex group

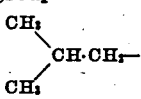

in substitution for this same H in glycine. In view thereof, alpha amino acids generally may be written

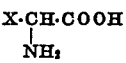

wherein X equals hydrogen or a group substituted therefor onto the alpha CH group.

Heretofore in the art, hydrolysis of protein in the presence of a basic oxide has been effected. Such hydrolysis procedure results in considerable oxidation of the hydrolysate product which is undesirable in that decomposition of the complex structures of which the group X may be comprised in the formula

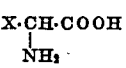

is usually effected with resultant loss of valuable organic compounds.

When such hydrolysis, however, is conducted in the presence of an aliphatic amine, oxidation of the hydrolysates or of the "X" structure of the alpha amino acids comprising the protein molecule is substantially eliminated, due, it is believed, to the fact that the reaction tends to go in the direction of metal amide formation as an intermediate reaction product liberating nascent hydrogen for the reduction of the alpha amino group of the amino acid. Thereafter when the metal of the amide is displaced during the substitution reaction, reducing instead of oxidizing conditions are maintained in the solution by the presence of the free metal ion or by its reaction with water to form oxide or hydroxide. This may not be the true explanation but the absence of oxidation conditions leads to this conclusion, and it is my belief that the decomposition of the peptide linkage is one of hydrogenation rather than by hydrolysis.

In accordance with the present invention, therefore, it is contemplated subjecting the protein molecule to the action of a basic metal oxide or hydroxide in an aqueous solution of an aliphatic amine containing at least one amino nitrogen group attached directly to an aliphatic carbon in which group there is at least one displaceable amino hydrogen, at a temperature at which the reaction proceeds at an economically practical rate, controlling the extent of degradation of the protein molecule by regulating the time of the reaction to obtain partial to complete degradation of the protein molecule with the resultant formation with any given amine and protein long chain carboxylic substituent groups containing a plurality of amino acid molecules bound together by peptide linkages having the carboxylic group of the amino acid molecule at one end of the chain neutralized by a basic metal ion and the alpha amino group of the amino acid molecule at the opposite end displaced with resultant substitution of the chain at the alpha CH group of the molecule onto the amino nitrogen of the amine in place of an amino hydrogen.

These compounds generally may be indicated by the formula:

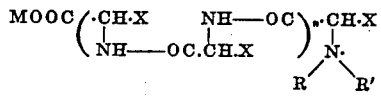

and

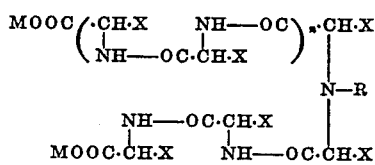

wherein R equals the remainder of an aliphatic amine containing at least one amino nitrogen attached directly to an aliphatic carbon; R' equals a substituent group for one amino hydrogen; M equals a metal ion; and X equals the remainder of the alpha amino acid molecule attached to the alpha CH group of the said acid.

In the above equations the chain length included within the parenthesis may consist of $n$ atoms where $n$ equals zero or any number less than the total number of atoms included within the protein molecule. As a practical matter, the number $n$ becomes a number very much less than the total number of amino acid molecules included within a protein molecule, for the reason that the total amount of splitting of the plurality of peptide linkages cannot be controlled or regulated within close limits. However, by varying the time interval of reaction to be short, medium and prolonged time intervals, substituted carboxylic amines containing substituent groups having a large number of peptide-linked amino acid groups, a smaller number of peptide-linked groups and substantially no peptide-linked groups may be obtained.

As an illustration of the practice of the present invention, a determined weight of a protein, for example, 500 grams of casein, suspended in 5000 c. c. $H_2O$ containing 500 grams of di propyl amine, and 250 grams of a caustic alkali such as NaOH, when heated to a refluxing temperature of about 110° C. under conditions excluding atmospheric oxygen, for example, in a container provided with a refluxing condenser opening from the condenser to the air through a one-way valve permitting the escape of uncondensed gases to the atmosphere at a determined positive pressure, will when heated for varying time intervals ranging from 5 hours to 20 hours, produce the sodium salt of substituted carboxylic amines wherein the substituent carboxylic group is of varying chain length decreasing with increase in the time of heating.

The amount of the amine added to the above solution is in large excess of that theoretically required to react with the total number of alpha amino acid molecules present in the protein, and the amount of caustic alkali present is in excess of the total amount of such alkali required to effect neutralization of all of the carboxylic acid groups present in the plurality of alpha amino acid molecules present in the said protein. The amount of the excess amine and caustic alkali may be varied widely without essential departure from the present invention, as such excess insures the progress of the reaction in the direction of carboxylic substitution.

In general, in the above described method of converting the alpha amino acid content of protein into substituted carboxylic amines wherein the substituent group consists of from one to a plurality of alpha amino acid molecules terminating at one end in a carboxylic salt of a basic metal and at the other end in a CH group bound to the amino nitrogen of an aliphatic amine, the amount of water to be employed with any given protein is preferably that which is sufficient to maintain a liquid phase reaction between the protein and the amine. In the case of amines that are insoluble in the aqueous solution present, I may employ a non-reactive solvent such as a tertiary alcohol to form an amine solution that is miscible with the water solution. Also in the case of an amine that exists in the vapor state at the temperature of refluxing, I may feed the amine into the heated solution at a rate which permits complete absorption of the amine in the solution. Various other modifications of the practice outlined above may be made without essential departure from the present invention as one skilled in the art will recognize.

The most useful of the carboxylic acid substituted amines producible by the practice of the present invention are the tetra carboxylic acid substituted amines obtainable by reacting an aliphatic diamine conforming to the structure $NH_2 \cdot (CH_2)_n \cdot NH_2$ wherein $n$ may be the numeral, 2, 3, 4, 5, etc., with the protein as above disclosed. Ethylene diamine, tri methylene diamine, tetra methylene diamine, penta methylene diamine, etc., are typical examples of such diamines.

These tetra carboxylic acid substituted amines have chemical and physical properties that adapt the same for extensive use as de-ionization agents in water solutions, as extenders and plasticizer agents in association with natural and artificial polymers of rubber-like structures, and in various other fields of use, and as intermediates in organic synthesis reactions generally.

When ethylene diamine, for example, is added to the alkaline solution above described, in an amount providing one molecule of the diamine for each four (4) molecules of alpha amino acid molecules present in the protein, the mono meric tetra carboxylic acid (Na salt) substituted diamine is obtained where the time of reaction is extended to the point where the biurette test shows that all the peptide-linkages have been broken. Where the time interval of heating is shortened to a fraction of this maximum time interval, intermediate poly-meric carboxylic substituent groups are obtained.

The protein casein has been reported as consisting in large part of glutamic acid $$C_3H_5 \cdot NH_2 \cdot (COOH)_2$$

However, when treated as above described and reacted with an amine to the extent destroying all peptide-linkages the carboxylic acid substituent product obtained consists mainly of the acid complex $(CH_3)_2 \cdot CH \cdot CH_2 \cdot CH \cdot (NH_2) COOH$, indicating that the main alpha amino acid constituent of casein is the acid leucine.

However, a considerable number of other alpha amino acids are present in casein and the mixture of tetra carboxylic acid substituted diamines obtained by the practice of the above described invention appears to have many valuable properties not normally present in a substantially pure tetra carboxylic diamine, such as that obtainable by the reaction of the substantially pure metal salt of glycine

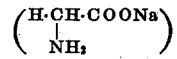

with the diamine.

The tetra carboxylic acid substituted diamines formed as above indicated may be recovered from the aqueous solution by acidifying the solution with a strong mineral acid such as HCl or $H_2SO_4$ to a pH at which the acid is least soluble and separating the precipitated acid from the metal salt solution. The tetra acid compounds are substantially insoluble in cold water but are soluble in acid and alkali solutions and are generally solubilized by any metal oxide, hydroxide or carbonate, the metal constituent of which is capable of displacing an acid hydrogen. Many different inorganic and organic compounds may be formed from these tetra carboxylic substituted amines for use in a plurality of different ways.

The tetra carboxylic substituted diamines in which the substituent group consists of a chain consisting of a plurality of peptide-linked alpha amino acid molecules having the carboxylic group of one end molecules stabilized by a basic metal ion and the opposite end molecule minus its alpha amino group and connected at the alpha CH group directly to the amino nitrogen of the amine, are essentially unstable compounds, subject to the hydrolytic splitting up of the several peptide linkages contained therein and to further substitution therein of an amino nitrogen linkage between the peptide-linked molecules in accordance with the method disclosed and claimed in co-pending application Serial No. 485,344, filed May 1, 1943, which application is assigned to the same assignee as the present application, to form long chained resinous-like amino acid substituted amino complexes of great utility in the art of forming artificial fibers and threads for the production of spun and woven products.

In the practice of the present invention, in place of caustic alkali or in addition to caustic a'kali, substantially any metal oxide or hydroxide whose metal ion is capable of displacing acid hydrogens from the carboxylic acid group may be employed. For example, an alkaline earth metal oxide or hydroxide, or a heavy metal oxide or hydroxide such as iron oxide or hydroxide or various mixtures of metal oxides and hydroxides may be employed, if desired. Beryllium oxide and hydroxide and various alkali metal compounds with other metal oxides such as plumbates, beryllates, vanadates, molybdates, etc., may alternatively be employed to good advantage in the present invention. In general, however, I have found it preferable to employ an alkali metal hydroxide as the alkali metal salts of the amino acids are not only the most soluble but are also the most stable of the metal salts under the conditions of reaction and moreover produce readily soluble salts with strong mineral acids facilitating subsequent precipitation and purification of the tetra carboxylic substituted diamine.

In place of casein, any of the naturally occurring protein materials may be used, such as soy bean meal, sugar beet residues, albumin, etc. The particular carboxylic substituent group obtained by the use of these different proteins will, of course, vary with the particular protein employed, depending upon the particular alpha amino acid or acids of which the protein molecule is comprised. The basic reaction resulting in the splitting up of the peptide-linkage with resultant displacement of the alpha amino nitrogen group of the amino acid and the formation of a carboxylic substituted amine wherein the substituent group is the carboxylic residue of the amine acid and may consist of a plurality of peptide-linked molecules of the amino acid, as hereinabove described, however, remain the same.

The above indicated reaction resulting in the formation of carboxylic substituted amines upon the hydrolysis of alpha amino acid molecules joined together by peptide-linkages in the presence of a basic metal oxide or hydroxide and in the presence of an aliphatic amine having at least one amino group with at least one displaceable amino hydrogen, is characteristic of all alpha amino acids existing in molecular form or in chain form as a result of peptide-linkage, such as protein or synthetic peptide-compounds, and insofar as the present invention is concerned peptides and poly peptides of an alpha amino acid, such as the well known di keto piperazine condensation products, are substantial equivalents for protein.

Having hereinabove described the present invention generically and specifically and given two specific examples of the practice of the same it is believed apparent that the same may be widely varied without essential departure therefrom and all such are contemplated as may fall within the scope of the following claims.

What I claim is:

1. The method of treating protein materials to convert the alpha amino acid content of the protein into metal salts of carboxylic acid substituted amines having a desired mono to poly molecular chain length protein hydrolysate substituent group therein, which comprises suspending the protein in water and hydrolyzing the alpha amino acid content of the protein in the presence of an inorganic base and an organic base consisting of an aliphatic amine having at least one amino nitrogen group containing at least one displaceable amino hydrogen therein, by heating the suspension to a refluxing temperature under a positive pressure of the uncondensed gases evolved from said suspension sufficient only to prevent the entry of atmospheric gases to the reacting compounds of said suspension, the excess pressure of said uncondensed gases being vented to the atmosphere, the amount of said inorganic base being at least sufficient to provide sufficient metal ions to neutralize all carboxylic acid groups of the alpha amino acids reconstituted during hydrolysis and the amount of said organic base being in large excess of that amount providing at least one displaceable amino hydrogen for each alpha amino nitrogen group of the neutralized reconstituted alpha amino acids, the time interval of heating being selected to provide the said desired chain length in the neutralized alpha amino acid hydrolysate product for substitution reaction with said organic base.

2. The method of converting the alpha amino acid content of protein materials into carboxylic acid substituted amines having a determined chain length protein hydrolysate substituent group therein, which comprises suspending a known weight of the protein in water, adding thereto an amount of an inorganic base at least sufficient to neutralize substantially all of the carboxylic acid groups contained in the alpha amino acid content of said protein material and an amount of an aliphatic amine containing at least one amino nitrogen group having at least one displaceable amino hydrogen therein, said amount being in large excess of that amount providing one displaceable hydrogen for each alpha amino nitrogen group of the alpha amino acids present in said protein material, and heating said suspension to a refluxing temperature under a positive pressure of the uncondensed gases evolved from said suspension sufficient only to prevent the entry of atmospheric gases to the reacting compounds of said suspension, venting the excess pressure of the said uncondensed gases to the atmosphere, for an extended period of time providing the said determined chain length protein hydrolysate substituent group.

3. The method of converting the alpha amino acid content of casein into carboxylic acid substituted amines having a mono to poly molecular chain length protein hydrolysate substituent group therein, which comprises suspending a known weight of the casein in water, adding thereto a caustic alkali and an aliphatic amine containing at least one amino nitrogen group having at least one displaceable amino hydrogen therein, and heating the suspension to a refluxing temperature under a positive pressure of the uncondensed gases evolved from the suspension sufficient only to exclude atmospheric gases from the heated suspension, the excess of said uncondensed gases being vented to the atmosphere, the amounts of said caustic alkali and said aliphatic amine relative to the amount of said casein being at least sufficient to provide for the complete neutralization by said caustic alkali of all carboxylic acid groups in the alpha amino acid hydrolysate product of the said casein and to provide a large excess of the amine over that providing at least one displaceable amino hydrogen for each alpha amino group in the said alpha amino acid hydrolysate product of the said casein, and the time interval of heating being extended to that providing the desired mono to poly molecular chain length of neutralized protein hydrolysate substituent group for substitution reaction with said amine.

4. The method of converting the alpha amino acid content of a protein into an alkali metal salt of a carboxylic acid substituted amine having a desired mono to poly molecular chain length protein hydrolysate substituent group therein, which comprises suspending a known weight of the protein in about ten times its weight of water, adding thereto an amount of caustic alkali approximating one-half the weight of protein, and an amount of an aliphatic amine having at least one amino nitrogen group containing at least one displaceable amino hydrogen therein, providing a large excess of amine over that theoretically required to provide one displaceable amino hydrogen for each alpha amino nitrogen group in the alpha amino acid hydrolysate product of said protein, and heating the suspension to a refluxing temperature under a positive pressure of the uncondensed gases evolved from the suspension sufficient only to exclude atmospheric gases from the heated suspension, the said uncondensed gases in excess of said pressure being vented to the atmosphere, the time interval of said heating being selected within the range 5 to 20 hours to provide the desired mono to poly molecular chain length protein hydrolysate substituent group.

5. The method of converting the alpha amino acid content of casein into an alkali metal salt of a carboxylic acid substituted amine having a desired mono to poly molecular chain length protein hydrolysate substituent group therein, which comprises suspending a known weight of casein in about ten times its weight of water, adding thereto about one-half its weight of caustic alkali and about its same weight of dipropyl amine, and heating the suspension to a refluxing temperature approximating 110° C. under a positive pressure of the uncondensed gases evolved from the heated suspension sufficient only to exclude atmospheric gases from the heated suspension, venting the excess uncondensed gases to the atmosphere, for a time interval within the range 5 to 20 hours providing the said desired chain length protein hydrolysate substituent group.

FREDERICK C. BERSWORTH.